United States Patent Office

2,894,945
Patented July 14, 1959

2,894,945

DICARBOXYL STARCHES AND METHOD OF PREPARATION

Bernard T. Hofreiter, Ivan A. Wolff, and Charles L. Mehltretter, Peoria, Ill., assignors to the United States of America as represented by the Secretary of Agriculture No Drawing. Application December 19, 1956
Serial No. 629,425

3 Claims. (Cl. 260—233.3)

(Granted under Title 35, U.S. Code (1952), sec. 266)

A non-exclusive, irrevocable, royalty-free license in the invention herein described, throughout the world for all purposes of the United States Government, with the power to grant sub-licenses for such purposes, is hereby granted to the Government of the United States of America.

This invention relates to the preparation of dicarboxyl starches. The objects of the invention include the provision of processes for producing dicarboxyl starches by chlorite-oxidation of dialdehyde starch and the provision of dicarboxyl starches as novel compounds. Further objects and advantages of the invention will be evident from the following description.

As is well known in the field of carbohydrate chemistry, when starch is reacted with a periodate there is produced a compound which is generally termed dialdehyde starch or periodate-oxidized starch. An efficient method for preparing the compound is disclosed by Dvonch et al. in U.S. Patent No. 2,648,629. The periodate oxidation causes drastic changes in the starch structure. Thus whereas starch is a homopolymer of glucose, dialdehyde starch is a heteropolymer of erythrose and glyoxal, the former being a 4-carbon atom trihydroxy monoaldehyde, the latter being a 2-carbon atom dialdehyde.

On of the characteristics of dialdehyde starch is that it is essentially insoluble in water. For example, it cannot be dispersed in water to form pastes, as is possible with starch. If dialdehyde starch is heated with water, at best only a limited amount of material goes into solution and the resulting solution has little viscosity. On cooling, the dialdehyde starch settles out on the bottom of the solution. For these reasons dialdehyde starch has no usefulness in the preparation of pastes or in thickening applications.

We have found that the chlorite oxidation products of dialdehyde starch possess a substantial degree of water solubility and the products are therefore useful in many applications.

The process of the invention essentially involves intimately contacting dialdehyde starch with an inorganic chlorite in an acidic reaction system. The reaction which occurs is illustrated by the following equation—

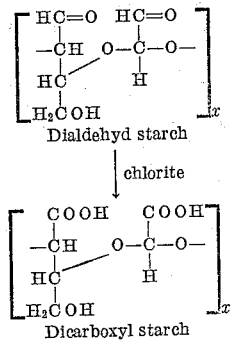

In the above formulas $x$ represents the number of repeating units in the dialdehyde starch and dicarboxyl starch. The terminal groups of the molecules contain a hydroxy radical and a hydrogen group, respectively, attached to the free terminal bonds of the group. The value of $x$ may vary from as low as 10 to many thousand.

The chlorite oxidation process of the invention involves several significant factors. In the first place, the process yields complete conversion of carbonyl groups to carboxyl groups in that each dialdehyde unit of the starting material is converted into a dicarboxyl unit. At the same time, no appreciable degradation (depolymerization) occurs. As is evident from the formula above, the oxidation is selective in that the aldehyde group of the erythrose moiety is oxidized to a carboxyl group and the aldehyde group of the glyoxal moiety is also oxidized to a carboxyl group. However, the acetal linkages connecting the erythrose and glyoxal moieties are not affected. That such a selective action is attained could not have been predicted from the prior art.

We are aware that dialdehyde starch has been oxidized by bromine in a barium acetate-buffered solution (Jeanes and Hudson, Jour. Org. Chem., vol. 20, pp. 1565–1568, November 1955). However, in this process, analysis indicated that there was only a 54% conversion of aldehyde groups to carboxyl. In no case has it been disclosed that each of the carbonyl groups of the dialdehyde starch repeating unit can be oxidized to carbonyl groups while retaining the polymeric dimensions of the starting material.

The dicarboxyl starches of the invention have many useful applications. By dispersing the dicarboxyl starch in water there are formed relatively clear, viscid solutions which are useful for sizing paper, textiles, and cordage. The dispersions, or pastes as they may be termed, are also useful as adhesives for manufacture of paper bags, boxes and the like. The dicarboxyl starches are also useful as thickening agents in textile printing pastes, in water paints and the like. The dicarboxyl starches have suspending properties and thus can be incorporated in minor amount (1 to 5%, for example) in soaps or synthetic detergents (for example, sodium lauryl sulphate or sodium long-chain alkyl benzene sulphonates) in order to give improved washing performance by holding the removed soil in suspension and preventing it from redepositing on the washed fabric. Also, the dicarboxyl starches are polyelectrolytes and can be incorporated in agricultural soils, especially clay or heavy silt soils, to improve the water and air permeability of the soil, to reduce erosion and increase the water retention characteristics of the soil. Moreover, the dicarboxyl starches are useful as intermediates for the preparation of resins. As an example, they may be heated with a polyamine such as ethylene diamine, diethylene triamine, hexamethylene tetramine, or the like, to produce resins which are useful for coating surfaces, for producing molded articles such as buttons, fountain pen barrels, cups, or other miscellaneous articles.

As noted above, the process of the invention involves intimately contacting dialdehyde starch with a chlorite. It is preferred to conduct the reaction in an aqueous system using enough water to form a slurry with the dialdehyde starch. The amount of water is not critical; usually there is used about 1 to 10 parts water per part of dialdehyde starch. In order to achieve complete conversion of carbonyl groups to carboxyl groups it is necessary to employ at least 3 moles of chlorite per aldehyde (CHO) group. Usually 4 moles are employed and more can be employed without any particular advantage or disadvantage. The reaction mixture is maintained in an acidic condition to accelerate the conversion of aldehyde groups to carboxyl groups. Acidic conditions are preferably maintained by adding a weak acid to the system. For this purpose one may employ acetic acid, propionic acid, boric acid, or other acid buffering agent. Usually enough buffer is used to maintain a pH of 3 to 5. The reaction is conveniently carried out at room temperature (25° C.) although the temperature may vary from about 0° C. to 50° C. The time of reaction will vary inversely with temperature and the concentration of chlorous acid produced in the acidic aqueous reaction mixture. In typical cases with a temperature of 25° C. and a one molar concentration of chlorite in the reaction system, the reaction is complete in about 1 to 3 hours. Where lower temperatures or lesser concentrations of chlorite are used, the reaction may take as long as 24 hours. Obviously, the shorter reaction time is preferred. In any particular instance the time for complete reaction can be readily gauged by noting the water solubility of the product since conversion of aldehyde to carboxyl gives increasing water solubility. In general, it is preferred to employ sodium chlorite to supply the necessary chlorite for the oxidation; other water-soluble inorganic salts of chlorous acid can of course be used. Since the oxidation is carried out in an acidic medium, the active agent in the oxidation can be considered as chlorous acid.

The process of the invention can be applied to various grades of dialdehyde starch. Thus in the production of dialdehyde starch, the degree of conversion of glucose units to erythrose-glyoxal units can be varied.

One can obtain dialdehyde starches containing anywhere from 0.5 to 100% of dialdehyde units. A dialdehyde starch containing 50% dialdehyde units, for example, means that of 100 repeating units in the chain, 50 are dialdehyde (erythrose-glyoxal) units. The process of the invention can be applied to any of these grades of dialdehyde starch to produce dicarboxyl starches of varying properties. In applying the process of the invention, to these various grades of dialdehyde starch, only the dialdehyde units of the starting material are converted to dicarboxyl units; the glucose units of the starting material remain as such. The dicarboxyl content of the products is expressed in percent, meaning the number of dicarboxyl units in 100 repeating units of the molecule. Starting with the corresponding dialdehyde starches, we have produced dicarboxyl starches having from 0.5 to 100% dicarboxyl units.

After the oxidation has been completed the dicarboxyl starch may be isolated in various ways. A preferred technique is to precipitate the dicarboxyl starch by adding to the reaction mixture a completely or partly water-soluble organic solvent such as ethanol, propanol, isopropyl alcohol, any of the isomeric butyl alcohols, acetone, or the like. Usually it is preferred to first neutralize the reaction mixture with sodium hydroxide, potassium hydroxide or other alkaline material. The precipitate can be further purified by washing with water containing any of the aforesaid solvents. Another technique is to precipitate the dicarboxyl starch by saturating the reaction mixture with a salt such as sodium chloride, sodium sulphate, ammonium sulphate, or the like. The dicarboxyl starches can also be precipitated by adding to the reaction mixture a heavy metal salt such as barium chloride, lead acetate, copper sulphate, or the like. In the case of dicarboxyl starches which contain a low percentage of carboxyl groups the dicarboxyl starch can be isolated in high yield by direct filtration of the oxidation mixture followed by washing of the dicarboxyl starch with water or alcohol-water solutions to remove contaminating salts and acids.

Since the dicarboxyl starches of the invention contain carboxyl groups, one can readily convert them into salts. For example, by treating them with sodium hydroxide they may be converted into the sodium salts of the dicarboxyl starches. In the same way salts of any metal such as potassium, calcium, barium, copper, iron, nickel, etc. may be prepared by the usual neutralization or metathetical processes. Moreover, the dicarboxyl starches may be formed into salts by reacting them with ammonium hydroxide or organic bases such as ethylamine, ethanolamine, aniline, morpholine, piperidine, tetramethylammonium hydroxide, and the like.

The invention is further demonstrated by the following illustrative examples.

Example I

One hundred grams of dialdehyde starch containing 10% dialdehyde units was slurried in 400 ml. water. To the mechanically stirred slurry was added 80 ml. of a solution containing 44.4 grams of sodium chlorite and 14 ml. of glacial acetic acid. The initial pH was 3.9. The reaction was allowed to continue with constant stirring and was kept at 25° C. except for a brief initial rise in temperature (to 36° C.) during the first few minutes of reaction. At the conclusion of the 3 hour period the pH was 4.62.

Sodium hydroxide was added to bring the pH to 8.35 and the mixture stirred for about 5 minutes. Then, 2 volumes of absolute alcohol were added and the gummy precipitate of dicarboxyl starch which formed was collected on a sintered glass (medium porosity) funnel. The precipitate of dicarboxyl starch was washed several times with 80% alcohol until traces of chloride ion were removed and the dicarboxyl starch lost its gummy nature and became granular. The dicarboxyl starch was dried in a desiccator and equilibrated at 19° C. and 65% R.H. The dicarboxyl starch weighed 123 grams on the moist basis, yield 97%. It was found that the dicarboxyl starch contained 9.9% dicarboxyl units, meaning that of 100 units in the chain, 9.9 were dicarboxyl units. Since the starting material contained 10% of dialdehyde units the conversion of carbonyl to carboxyl groups was essentially complete.

Example II 5.8 grams of dialdehyde starch (60% dialdehyde units) was slurried in 100 ml. water. To this slurry was added 45 ml. of a solution containing 13.44 grams of sodium chlorite and 4.26 ml. of glacial acetic acid. The mixture was held at room temperature (25° C.) while constantly stirred for 3 hours. Initial pH was 3.43; final pH 4.52. After the 3 hr. reaction period the mixture was neutralized with sodium hydroxide solution and 2 volumes of absolute alcohol added. The gummy precipitate of dicarboxyl starch was removed, dissolved in 100 ml. water and re-precipitated by adding alcohol to a concentration of 90% (vol./vol.). The fine white precipitate of dicarboxyl starch was removed by filtration and dried in a desiccator. The yield was 91% of theoretical and the dicarboxyl starch contained 58% dicarboxyl units.

Example III

A series of dialdehyde starches of varying dialdehyde content were subjected to chlorite oxidation in accordance with the procedure described above. In each case the dialdehyde starch was slurried in an amount of 1 molar sodium chlorite solution to furnish 4 moles of chlorite per aldehyde group in the starting material. The amount of acetic acid was ½ mole per mole of chlorite. The reaction was conducted at 25° C. for various periods of time as set forth below. The results obtained are tabulated below.

| Run | Dialdehyde content of starting material, percent | Dicarboxyl content of dicarboxyl starch, percent, after reaction time of— | | | | Conversion of dialdehyde starch to dicarboxyl starch, after 3 hrs., percent |
|---|---|---|---|---|---|---|
| | | ¼ hr. | 1 hr. | 3 hrs. | 24 hrs. | |
| 1 | 10 | 8.2 | 9.4 | 9.9 | 10 | 9.9 |
| 2 | 20 | 14 | 18 | 21 | 21 | 105 |
| 3 | 40 | 33 | 40 | 40 | 41 | 100 |
| 4 | 61 | 52 | 58 | 58 | 58 | 96 |
| 5 | 74 | 68 | 72 | 73 | 71 | 98 |
| 6 | 94 | 87 | 88 | 91 | 92 | 97 |

The above data vividly demonstrate the selectivity and completeness of the reaction. For example, considering run #3, after 3 hours all of the dialdehyde starch had been converted to dicarboxyl starch and all of the dialdehyde groups had been converted into dicarboxyl groups. Even after 24 hours of reaction, the dicarboxyl content had risen only to 41% indicating that a very minor proportion of the glucose units of the starting material had been oxidized. The data therefore clearly indicate that the process of the invention effects complete conversion of the dialdehyde groups to dicarboxyl groups while causing at most a very minor oxidation of the glucose units in the starting material. Thus in applying the process to a dialdehyde starch containing some glucose units and some dialdehyde (erythrose-glyoxal) units, only the latter are oxidized, the glucose units remain intact. It is this selectivity which makes it possible to prepare from a 50% dialdehyde starch a 50% dicarboxyl starch, from a 25% dialdehyde starch a 25% dicarboxyl starch, and so forth, in any case the percentage of dicarboxyl in the product being essentially the same as the percentage of dialdehyde in the starting material.

*Example IV*

100 grams of 2 percent dialdehyde starch was slurried in 100 ml. of water and while stirring 48 ml. of aqueous solution containing 13.35 grams of sodium chlorite and 4.2 ml. of glacial acetic acid were added. The pH of this reaction mixture when first mixed was 3.59 and changed to 4.35 after 3 hours reaction time. The reaction mixture was filtered and the dicarboxyl starch obtained as a precipitate washed four times by suspension in 200 ml. of water and filtration. The recovered dicarboxyl starch was put in a vacuum desiccator overnight over $CaCl_2$ and then equilibrated at laboratory conditions. The weight of recovered material was 98.7 grams which is a 97.8 percent yield.

*Example V*

The dicarboxyl starch of Example II was made up into 5 percent paste in warm water. Cotton yarn was coated with this paste and dried. It was observed that the coating made the yarn stiffer and decreased its fuzziness so that the yarn was smooth and well suited for freely passing through eyes, guides, shuttles, and other mechanical devices as encountered in spinning, weaving, and other textile operations.

Having thus described our invention, we claim:

1. A process for preparing dicarboxyl starch comprising reacting periodate-oxidized starch with a water-soluble inorganic salt of chlorous acid in an aqueous medium at a pH from about 3 to 5 at a temperature from about 0° C. to 50° C., the salt of chlorous acid being employed in an amount of at least 3 moles per aldehyde group of the starch, whereby all the aldehyde groups of the starch are oxidized to carboxyl groups without appreciable depolymerization of the starch.

2. A process for preparing dicarboxyl starch comprising reacting periodate-oxidized starch with sodium chlorite in an aqueous medium at a pH from about 3 to 5 at a temperature from about 0° C. to 50° C., the sodium chlorite being employed in an amount of at least 3 moles per aldehyde group of the starch, whereby all the aldehyde groups of the starch are oxidized to carboxyl groups without appreciable depolymerization of the starch.

3. Dicarboxyl starch consisting of a heteropolymer composed of dicarboxyl monomer units and anhydroglucose monomer units, said dicarboxyl monomer units being erythronic acid radicals in hemi-acetal linkage with glyoxylic acid radicals, the terminal groups of said heteropolymer being hydrogen and a hydroxyl group, said dicarboxyl starch being characterized in that it is readily dispersible in water forming a clear viscid solution.

References Cited in the file of this patent

Ellington et al.: "Estimation of Carboxyl, Aldehyde, and Ketone Groups in Chromium Trioxide Oxystarches," Canadian Jour. Chem. 31, 801–813 (1953).

Radley: "The Oxidation of Starch," Manufacturing Chemist and Manufacturing Perfumer, July 1942, XIII 7, pp. 158–166.

UNITED STATES PATENT OFFICE

CERTIFICATE OF CORRECTION

Patent No. 2,894,945                                                     July 14, 1959

Bernard T. Hofreiter et al.

It is hereby certified that error appears in the printed specification of the above numbered patent requiring correction and that the said Letters Patent should read as corrected below.

Column 1, line 39, for "On of" read -- One of --; line 61, under the first formula, for "Dialdehyd" read -- Dialdehyde --; column 4, line 70, in the table, third column thereof, under the subheading "1/4 hr.", first figure, for "8 2" read -- 8.2 --; fifth column thereof, under the subheading, "3 hrs.", first figure, for "0.0" read -- 9.9 --; same table, last column thereof, under the heading, "Conversion of dialdehyde starch to dicarboxyl starch, after 3 hrs., percent", first figure, for "9.9" read -- 99 --; column 6, line 20, for "50 C." read -- 50° C. --.

Signed and sealed this 26th day of January 1960.

(SEAL)
Attest:

KARL H. AXLINE                                                     ROBERT C. WATSON
Attesting Officer                                                Commissioner of Patents